Jan. 29, 1924.                    1,482,047
A. STEINBACH
ELECTRIC FAN
Filed Nov. 3, 1921
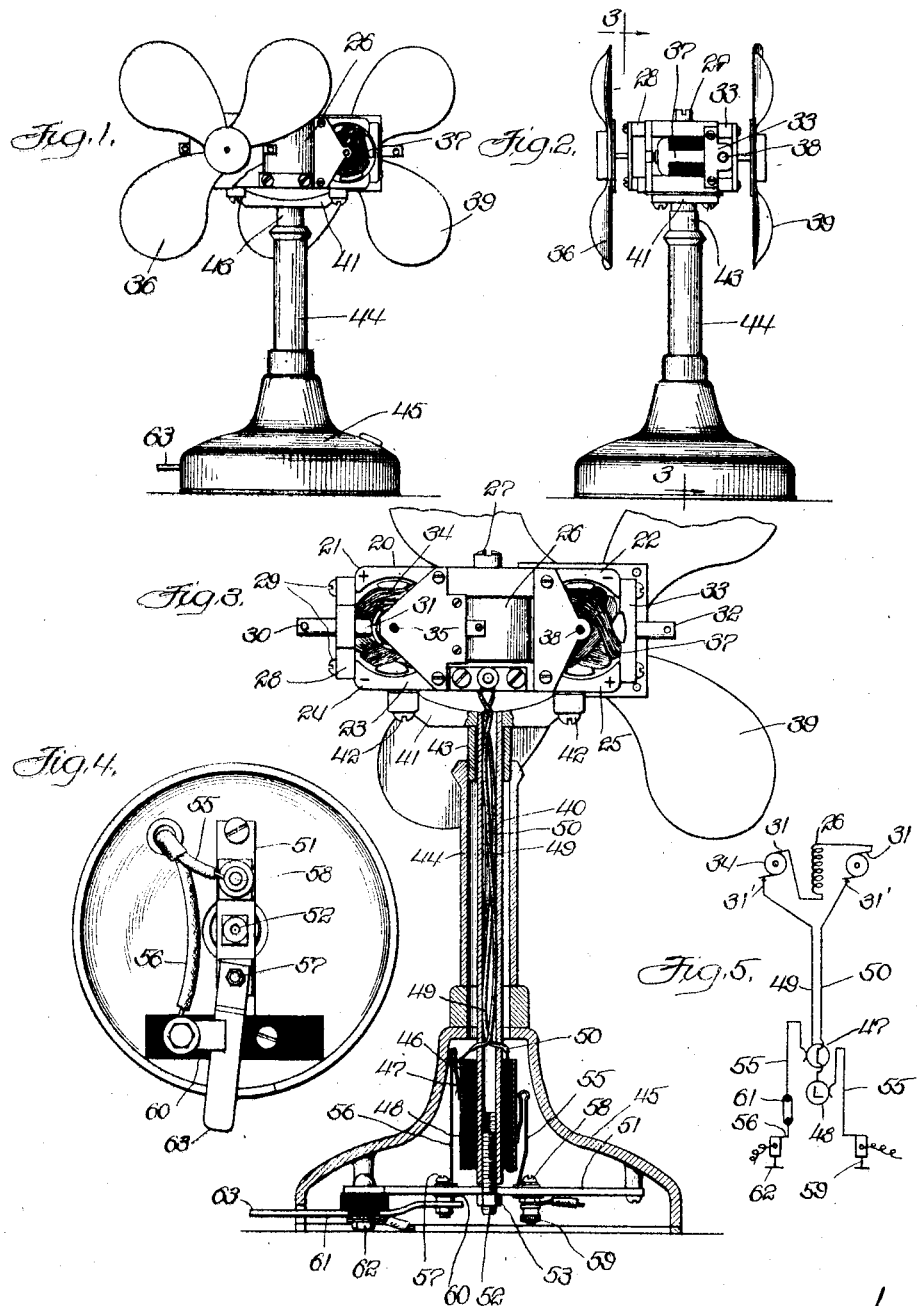
Inventor:
Arthur Steinbach
By Free Bain & Hinkle
Attys Patented Jan. 29, 1924.

1,482,047

UNITED STATES PATENT OFFICE.

ARTHUR STEINBACH, OF CHICAGO, ILLINOIS, ASSIGNOR OF ONE-HALF TO JOSEPH WEBER, OF CHICAGO, ILLINOIS.

ELECTRIC FAN.

Application filed November 3, 1921. Serial No. 512,427.

*To all whom it may concern:*

Be it known that I, ARTHUR STEINBACH, a citizen of the United States, residing at Chicago, in the county of Cook and State of Illinois, have invented certain new and useful Improvements in Electric Fans, of which the following is a specification.

The invention relates to improvements in electric fans.

One of the objects of the invention is to increase the production efficiency of electric fans by economizing in the field magnet construction in making one field magnet to serve two armatures and the absence of extraneous fan-rotating or oscillating mechanism.

Another object is to provide improved means to maintain the bodily revolving motor in circuit.

Another object is to generally improve devices of this character.

Other, further and more specific objects and advantages of this invention will become readily apparent, to persons skilled in the art, from a consideration of the following description when taken in conjunction with the drawings, wherein:—

Fig. 1 is an end elevation of my improved motor-driven fan-structure.

Fig. 2 is a side elevation of the fan structure.

Fig. 3 is a section taken on line 3—3 of Fig. 2.

Fig. 4 is a bottom plan view of the base, and

Fig. 5 is a diagram of circuits.

The motor structure consists of an upper paramagnetic plate 20 having pole pieces 21 and 22 and a lower magnetic plate 23 having opposing pole pieces 24 and 25. These plates are held together by a core around which the field coil 26 is placed. Screw 27 enters the ends of the core to hold the plates 20 and 23 in spaced relation. Between the poles 21 and 24 at one end of the field magnet structure is a bar of insulating material 28, secured to the respective poles by screws 29. On this insulating bar is a terminal 30 in which the sliding commutator brushes 31 are axially movable. Another terminal 32 is supported in like manner on the insulating bar 33. Between the poles 21' and 24 an armature 34 is rotatably supported upon the shaft 35 and having on the end of this shaft a fan 36. Another armature 37 is supported in like manner between the poles 22 and 25 on the shaft 38 which carries a fan 39.

The fan blades are dished in such a manner as to give rotary motion to the motor upon the axis afforded by the tube 40. The upper end of the tube 40 is connected to a curved bar 41 which is secured to the lower magnet plate 23 by screws 42 and which is provided with a threaded sleeve 43 screwed into the upper end of a tube 44. The tube 44 is secured to the base 45. On the lower end of the tube 40, and within the housing afforded by the base 45, is a sleeve of insulating material 46 carrying a conducting ring 47 and another spaced-apart conducting ring 48. The ring 47 is connected to one terminal of the motor by a wire 49, and the ring 48 is connected to the other terminal of the motor by a wire 50. In the base, 45, extending transversely thereof, is a bar 51. A screw 52 passes vertically thru the bar 51 into the tube 40 and a nut 53 prevents the tube 40 from being vertically moved out of the supporting tube 44.

Mounted on the bar 51 are springs 55 and 56, returned on themselves on their upper ends into contact with the rotating rings 47 and 48, respectively. More or less friction may be applied to prevent a ready rotation of the tube 40 and the motor connected thereto by tightening the nut 53. Screws 57 and 58 hold the springs 55 and 56, respectively, and screw 58 serves as a wire terminal 59 for one of the wires shown in the diagram in Fig. 5, and screw 57 provides on the other side of the bar a terminal 60 for the switch handle 61 which is pivoted at 62, and which extends outside of the casing, as at 63.

Now, it will be manifest from the foregoing description that the motor may be bodily rotated by the mutual rotation of the fans 36 and 39, and in this manner the device may be made to cover a large area in which the air is constantly kept moving by the operation of the fans and it is further manifest that the integrity of the circuit containing the motor of the fan may be maintained uninterruptedly by the mechanism contained in the base of the structure.

Having described my invention what I claim as new and desire to secure by Letters Patent, is—

An electric motor comprising two parallel flat plates having confronting concave ends at each end and joined together near their mid-portions by a magnet core; a coil surrounding the core; an armature between the plates at each end thereof; an electric circuit including both armatures and the coil in series and a support, upon which the motor is rotatably pivoted, in axial alignment with the core.

In testimony whereof I hereunto subscribed my name.

ARTHUR STEINBACH.